(12) United States Patent
Hoffmann

(10) Patent No.: US 10,323,582 B2
(45) Date of Patent: **\*Jun. 18, 2019**

(54) VEHICLE DRIVE SYSTEM, AND METHOD FOR OPERATING A VEHICLE DRIVE SYSTEM

(71) Applicant: Fuelsave GmbH, Walldorf (DE)

(72) Inventor: Dirk Hoffmann, Buchholz i.d.N. (DE)

(73) Assignee: Fuelsave GmbH, Walldorf (DE)

( \* ) Notice: Subject to any disclaimer, the term of this patent is extended or adjusted under 35 U.S.C. 154(b) by 0 days.

This patent is subject to a terminal disclaimer.

(21) Appl. No.: 15/747,990

(22) PCT Filed: Jul. 21, 2016

(86) PCT No.: PCT/EP2016/067387
§ 371 (c)(1),
(2) Date: Jan. 26, 2018

(87) PCT Pub. No.: WO2017/016969
PCT Pub. Date: Feb. 2, 2017

(65) Prior Publication Data
US 2018/0216543 A1    Aug. 2, 2018

(30) Foreign Application Priority Data

Jul. 29, 2015  (EP) .................................... 15178882

(51) Int. Cl.
*F02B 33/44* (2006.01)
*F02D 19/06* (2006.01)
(Continued)

(52) U.S. Cl.
CPC ............ *F02D 19/0671* (2013.01); *C25B 1/04* (2013.01); *C25B 15/02* (2013.01); *F01N 3/021* (2013.01);
(Continued)

(58) Field of Classification Search
CPC .............................. F02D 19/0671; C25B 1/04
(Continued)

(56) References Cited

U.S. PATENT DOCUMENTS

2006/0179819 A1   8/2006  Sullivan
2011/0094458 A1\*  4/2011  Dee ........................ F02D 19/081
                                                            123/3
(Continued)

FOREIGN PATENT DOCUMENTS

EP        1355049 A2    10/2003
EP        2602358 A1    12/2013
(Continued)

OTHER PUBLICATIONS

PCT/EP2016/067387, International Preliminary Report on Patentability, dated Jul. 4, 2017, 19 pages.

*Primary Examiner* — Ngoc T Nguyen
(74) *Attorney, Agent, or Firm* — Hoffman Warnick LLC

(57) ABSTRACT

A vehicle drive system is disclosed comprising an internal combustion engine for driving a vehicle, wherein the internal combustion engine comprises a combustion chamber with injectors for injecting diesel into the combustion chamber, a supply line for delivering a gas mixture to the combustion chamber, an electrolysis chamber for producing hydrogen gas and oxygen gas, and a vacuum pump for sucking the hydrogen gas and the oxygen gas from the electrolysis chamber. The vehicle drive system furthermore comprises a gasification tank with volatile organic compounds received therein, in particular methanol or ethanol, as well as a supply line for supplying a gas mixture to the combustion chamber, wherein the gas mixture comprises gasified organic compounds from the gasification tank and at
(Continued)

least a part of the hydrogen gas and the oxygen gas. Furthermore a corresponding method for operation a vehicle drive system is disclosed.

14 Claims, 1 Drawing Sheet

(51) Int. Cl.
    *F02B 43/10* (2006.01)
    *F02M 25/12* (2006.01)
    *F02D 19/08* (2006.01)
    *C25B 1/04* (2006.01)
    *C25B 15/02* (2006.01)
    *F01N 3/021* (2006.01)
    *F02B 37/04* (2006.01)

(52) U.S. Cl.
    CPC ............ *F02B 37/04* (2013.01); *F02B 43/10* (2013.01); *F02D 19/0644* (2013.01); *F02D 19/0684* (2013.01); *F02D 19/08* (2013.01); *F02M 25/12* (2013.01); *F02B 2043/106* (2013.01); *Y02E 60/366* (2013.01); *Y02T 10/121* (2013.01); *Y02T 10/144* (2013.01); *Y02T 10/32* (2013.01); *Y02T 10/36* (2013.01); *Y02T 90/42* (2013.01)

(58) Field of Classification Search
    USPC .................................................. 60/605.1, 602
    See application file for complete search history.

(56) References Cited

U.S. PATENT DOCUMENTS

2012/0067304 A1    3/2012    Littmann
2018/0216579 A1*  8/2018    Hoffmann ............... F02B 43/10

FOREIGN PATENT DOCUMENTS

| | | |
|---|---|---|
| KR | 20110119055 A | 11/2011 |
| WO | 2007085094 A1 | 8/2007 |
| WO | 2008033107 A2 | 3/2008 |

* cited by examiner

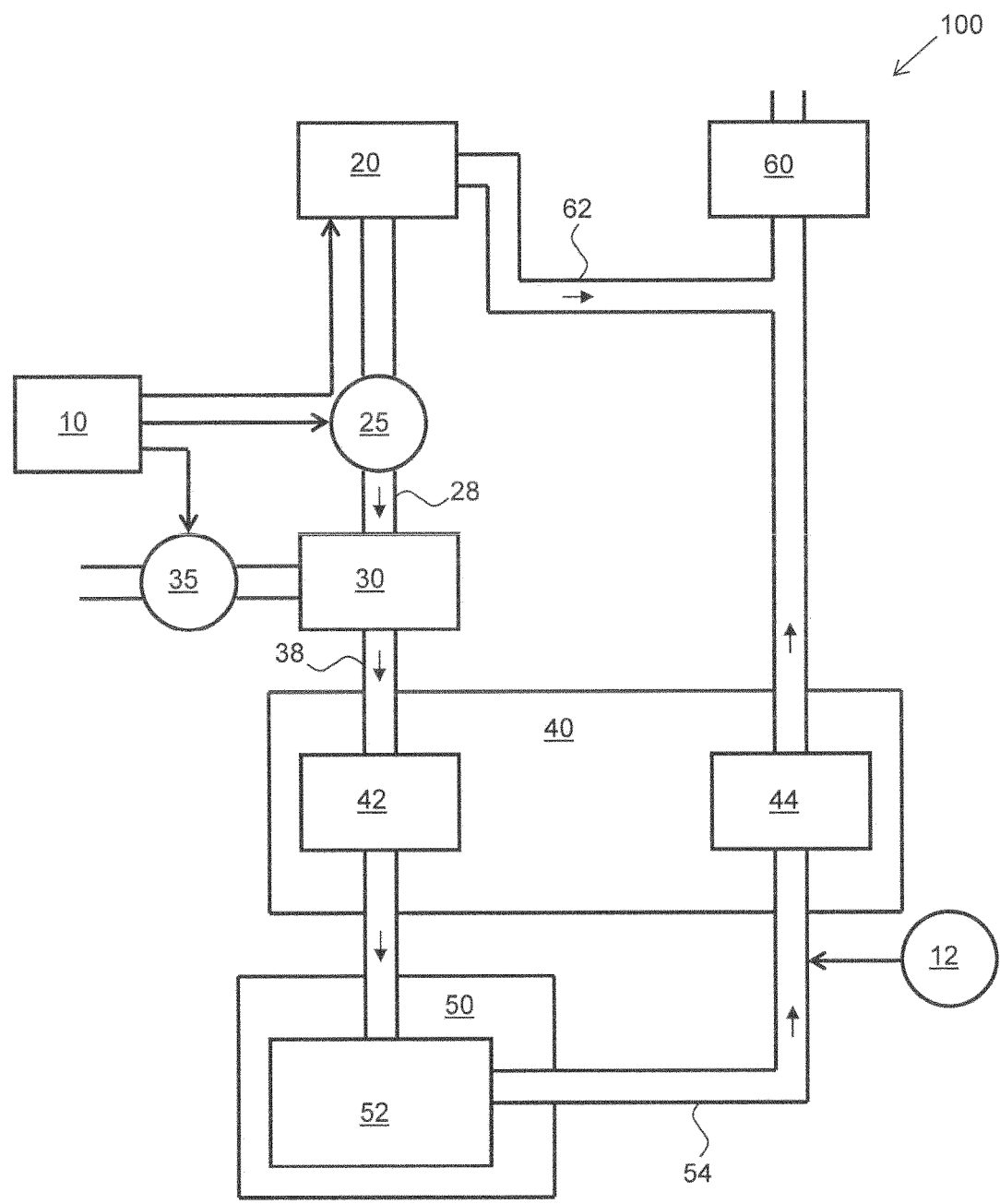

VEHICLE DRIVE SYSTEM, AND METHOD FOR OPERATING A VEHICLE DRIVE SYSTEM

FIELD OF THE INVENTION

The present invention relates to a vehicle drive system. The invention also relates to a method for operating a vehicle drive system.

Vehicle drive systems serve for driving land vehicles, in particular trucks and other commercial vehicles as well as cars. For this purpose a vehicle drive system comprises an internal combustion engine for, e.g., diesel fuel. Furthermore, a vehicle drive system may comprise an electrolysis chamber for producing hydrogen gas. The hydrogen gas can in general be used for replacing or supplementing diesel fuel.

RELATED ART

A generic vehicle drive system comprises an internal combustion engine for driving a vehicle, wherein the internal combustion engine comprises a combustion chamber with injectors for injecting diesel into the combustion chamber. The vehicle drive system also comprises an electrolysis chamber for producing hydrogen gas and oxygen gas as well as a vacuum pump for sucking the hydrogen gas and the oxygen gas out of the electrolysis chamber. In other words, the vacuum pump is arranged to, in operation, suck hydrogen gas and oxygen gas from the electrolysis chamber.

In a generic method for operating a vehicle drive system provision is made to drive a vehicle with an internal combustion engine, inject diesel fuel via injectors in a combustion chamber of the internal combustion engine, producing hydrogen gas and oxygen gas in an electrolysis chamber, and sucking the hydrogen gas and the oxygen gas out of the electrolysis chamber with a vacuum pump.

In the prior art various methods for using the produced oxygen gas and hydrogen gas are known.

EP 1 227 240 A2 describes to produce a mixture of hydrogen gas and oxygen gas by electrolysis and to add this to the fossil fuel of an internal combustion engine of a vehicle. The gas mixture produced by the electrolysis is here introduced directly into the intake manifold or another line directly leading to the internal combustion engine. Systems operating according to the same principle are described in U.S. Pat. No. 5,458,095 A as well as in U.S. Pat. No. 6,257,175 B1 and WO 2011/103925 A1.

From DE 10 2011 120 137 A1 a system is known in which oxygen gas produced by electrolysis is introduced into an internal combustion engine and hydrogen gas produced by electrolysis can be used separately.

Furthermore US 2010/0043730 A1 describes that hydrogen gas produced by electrolysis can be introduced into an internal combustion engine together with a fossil fuel.

For reducing nitrogen oxides in the exhaust gas, DE 42 37 184 A1 suggests to supply hydrogen gas produced by electrolysis to a catalyst of a vehicle whereas the produced oxygen gas can be supplied to the internal combustion engine.

With the mentioned documents a certain efficiency gain or a reduction in contaminants in the exhaust gases can be achieved. However, further efficiency improvements of internal combustion engines as well as a further reduction of pollutants in the exhaust gases are desired.

SUMMARY OF THE INVENTION

It may be regarded as an o b j e c t of the invention to provide a vehicle drive system and a method for operating a vehicle drive system in which an internal combustion engine operates with a particularly high efficiency and has particularly low emissions of pollutants in the exhaust gas.

This object is achieved with the vehicle drive system and with the method for operating a vehicle drive system disclosed herein. Preferred variants of the vehicle drive system of the invention and of the method of the invention are subject-matter of the dependent claims and are also described in the following specification.

The vehicle drive system of the above-referenced kind comprises, according to the invention, a gasification tank in which a volatile organic compound, in particular methanol or ethanol, is provided and is gasified there. Furthermore a supply line for supplying a gas mixture to the combustion chamber is provided, wherein the gas mixture comprises gasified organic compounds (i.e., a part of the volatile organic compounds from the gasification tank and which is transferred into a gaseous state) as well as at least a part of the hydrogen gas and oxygen gas produced in the electrolysis chamber. The supply line and the gasification tank are thus arranged such that, in operation of the vehicle drive system, a gas mixture as defined above is supplied to the combustion chamber.

According to the invention, the method of the above referenced kind is further developed in that volatile organic compounds, in particular methanol or ethanol, are gasified in a gasification tank and a gas mixture, which comprises gasified organic compounds as well as at least a part of the hydrogen gas and oxygen gas produced in the electrolysis chamber, is supplied into the combustion chamber.

As an idea of the invention, hydrogen gas and oxygen gas produced by electrolysis are only supplied into the combustion chamber together with gaseous volatile organic compounds, that means in particular together with gasified methanol and/or ethanol. Such a gas mixture can reduce production of $NO_X$ and may cause a particularly fast combustion of diesel in the combustion chamber. A fast combustion can produce a higher pressure at a defined point in time, which eventually allows for a more efficient power transmission.

The volatile organic compounds may in principle be a specific organic compound or a mixture of different organic compounds. The term "volatile" organic compounds may be understood as all organic compounds that are mainly gaseous at room temperature and/or have a boiling point below 100° C. or below 200° C. or 300° C. Organic compounds may in particular be hydrocarbons and/or all compounds that consist predominantly of hydrogen and carbon atoms. Examples of such organic compounds are alkanols (such as methanol and ethanol) or alkanes (such as methane or ethane).

The gasification tank may in principle be understood as any container in which volatile organic compounds are contained. There, at least part of the volatile organic compounds can be transferred from a liquid state into a gaseous state. The vacuum pump and the gasification tank may be preferably arranged such that the hydrogen gas and the oxygen gas are at least partially transported by the vacuum pump from the electrolysis chamber into the gasification tank. The gas mixture is thus produced in the gasification tank. The supply line may thus start at the gasification tank and may transport the gas mixture from there in the direction of the combustion chamber.

The gasification tank may thus comprise an inlet connected with the electrolysis chamber, and an outlet to output organic compounds that have been gasified (have been transferred into gaseous state) as well as hydrogen and oxygen gas that is being passed through. The gasification tank may further comprise a closable filling opening for refilling liquid organic compounds, for example ethanol.

It may be preferably to supply hydrogen gas and oxygen gas into the gasification tank through several nozzles which are provided in a lower part/portion of the gasification tank. In particular, the lower half or the lower quarter of the gasification tank may be regarded as the lower part. This introduction in the lower part advantageously leads to a stronger gasification. By using several nozzles, the introduced gases may flow through the gasification tank more evenly distributed, which is again advantageous for a stronger gasification.

The supply line as such may extend to the combustion chamber. However, in principle it is sufficient if the supply line connects with a supply device/means that leads the gas mixture to the combustion chamber. It may be preferred that the supply line connects with an air inlet manifold component/air drawing component of the internal combustion engine.

In a variant of the invention, a turbocharger is provided and the supply line is designed such that the gas mixture can be supplied to the combustion chamber via a compressor of the turbocharger. As an advantage, the combustion chamber and components of the vehicle drive system of the invention, which components directly border the combustion chamber, can be similarly built as in conventional vehicle drive systems. Furthermore, this variant of the invention allows a particularly effective control of the amount of the gas mixture that is led into the combustion chamber. This will be explained later in greater detail.

The electrolysis chamber may generally be understood as any device that produces hydrogen gas and oxygen gas, in particular $H_2$ and $O_2$, by using electrical energy. A starting substance of the electrolysis may be water or a hydrous/aqueous mixture. It may be preferred if the electrolysis chamber and a supply system/line system from the electrolysis chamber to the gasification tank are designed such that the produced hydrogen gas and oxygen gas are jointly or unseparated transported as oxyhydrogen. With a comparably simple construction this allows an exact timing of ignition in the combustion engine by introducing the oxyhydrogen.

Between the electrolysis chamber and the vacuum pump a condensate trap, i.e. a condensate separator, may be arranged. A separation between an electrolyte and the produced mixture of hydrogen/oxygen can be achieved in the condensate trap. In the condensate trap the electrolyte condensates and can then by pumped back into the electrolysis chamber with an electrolyte circulation pump. Advantageously the condensate trap can thus protect the internal combustion engine against entrance of liquids. Gaseous hydrogen and oxygen gases, in contrast, are sucked from the condensate trap with the vacuum pump.

The vacuum pump may be a pump/compressor of a generally arbitrary kind. It creates a low pressure/reduced pressure which sucks hydrogen gas and oxygen gas out of the electrolysis chamber. The vacuum pump may also consist of several pump units. This can be of particular advantage if the produced hydrogen gas and oxygen gas are separately sucked off, i.e., not as oxyhydrogen.

In addition to transporting hydrogen gas and oxygen gas from the electrolysis chamber, the vacuum pump may also enhance the efficiency of the electrolysis chamber. It may be desirable for an electrolysis that electrodes of the electrolysis chamber to be surrounded by liquid electrolyte. Cavitation or bubble production, i.e., gases such as produced hydrogen gas and oxygen gas, hamper the electrolysis and make higher tem-peratures necessary. This can be avoided in a variant of the invention in which the vacuum pump produces a reduced pressure in the electrolysis chamber, in particular a pressure below 1 bar, in particular between 200 mbar and 700 mbar, in particular between 300 mbar and 600 mbar or between 340 mbar and 580 mbar. Such a comparably low pressure allows operating the electrolysis chamber at a temperature below 40° C., in particular at 38 to 39° C. which increases efficiency of the electrolysis. The vacuum pump can be operated to suck as much gas (in particular produced hydrogen and oxygen gas) out of the electrolysis chamber so that at most a quarter of the electrolysis chamber, in some cases at most 10% of the electrolysis chamber, is filled with gas during operation of the electrolysis chamber.

The internal combustion engine of the vehicle drive system may be an engine built in a generally known way, which produces heat energy and thus movement energy for driving the vehicle by combustion of an (in particular fossil) energy carrier. Here, at least also diesel, i.e., a diesel fuel, is injected. The exact composition of the diesel fuel may vary in substantially known ways.

The vehicle drive system may also comprise an exhaust filter for cleaning exhaust gases, for example a soot filter. Efficient cleaning of the exhaust filter is important for a particularly long life span of the exhaust filter. This can be achieved with oxygen, $O_2$. If oxygen is added to the exhaust gases upstream of the exhaust filter, it can act as a radical and can thus serve to clean the filter. This is used in an embodiment of the invention in which a separator, for example a diaphragm, is provided for separating the hydrogen gas and the oxygen gas which can be produced in the electrolysis chamber. Furthermore a line for supplying a part of the oxygen gas to the exhaust filter is provided, wherein the gas mixture directed from the supply line to the combustion chamber comprises the remainder of the oxygen gas (i.e., the part of the oxygen gas which is not directed to the exhaust filter), and may further comprise the hydrogen gas as well as the gasified organic compounds.

Separating the produced oxygen gas and hydrogen gas may be carried out at in principle any location. It is also possible to supply oxygen gas and hydrogen gas from the electrolysis chamber unseparated to the combustion chamber, while a part of this oxyhydrogen mixture (i.e., the mixture of oxygen gas and hydrogen gas) is channeled off into a separate line and is only there separated with the separator into oxygen gas and—separated from the oxygen gas—hydrogen gas.

The electrolysis chamber is supplied with an electrical current with which the hydrogen gas and the oxygen gas are produced in the electrolysis chamber. Furthermore, water is introduced from which the hydrogen gas and the oxygen gas are produced. In some embodiments a controller/a control device is provided and configured to control the electrical current and/or a water supply into the electrolysis chamber and/or a pumping power of the vacuum pump in dependence of a momentary property of an operation of the internal combustion engine. The control may in particular be carried out such that the amount of the introduced gas mixture is the larger the more diesel is injected in a certain time period. The produced gas mixture thus does not serve as a replacement for a fossil energy carrier. Rather the gas mixture is used as an additive which influences the combustion process in a favorable manner. The controller may in particular set the current and the pumping power such that a relation of injected diesel to introduced gas mixture is substantially constant, i.e., substantially independent from an injection rate and an injected amount of diesel. "Substantially constant" may be regarded as comprising variations of up to 10%, preferably not more than 5%, of the afore-mentioned relation.

In a variant the controller is configured to use a boost pressure/manifold pressure of the internal combustion engine as the momentary property of the operation of the internal combustion engine in dependence of which the electrical current and the pumping power are set. The boost pressure indicates an air pressure in an air intake line of the internal combustion engine. The controller may be configured to set the electrical current and the pumping power the larger the higher the boost pressure is. Instead of the boost pressure in principle also another pressure which depends from the boost pressure may be used for the control, in particular an exhaust pressure, in particular upstream of a turbocharger. For determining the boost pressure and/or another pressure used for the control, respective pressure measuring means may be provided. Instead of using a pressure, it is also possible to use a property related to the engine power for the control, for example a gas pedal signal or an engine speed. It may occur that by using such electrical signals, errors may occur more easily com-pared with the case of using the (boost) pressure for the control.

It may be preferred that additionally an air compressor for transporting air/gas into the gasification tank is provided. The air may be ambient air, in particular a mixture of any gases. The more air is pumped into the gasification tank, the larger is the amount of gasified organic compounds. This increases the amount of the produced gas mixture. This is desirable when the internal combustion engine combusts fossil fuels with a particularly high rate and consequently a particularly large amount of produced gas mixture should be added.

For supplying a larger amount of produced gas mixture in the case of a larger amount of injected diesel, it may be preferred to operate the vacuum pump with increasing pumping power if the boost pressure increases. It may be provided that the vacuum pump is operated with maximum pumping power if the boost pressure reaches a predefined boost pressure value. If then the boost pressure surpasses this predefined boost pressure value, it will be desired to supply an even larger amount of gas mixture. While the amount of oxygen gas and hydrogen gas is limited by the vacuum pump and the electrolysis chamber, a larger amount of gasified organic compounds can, however, by supplied with the air compressor. It can thus be provided that the air compressor is additionally activated if the boost pressure surpasses the predefined boost pressure value. In particular, a power of the air compressor may be set the higher the further the boost pressure raises over the predefined boost pressure value. In these cases the vacuum pump is always operated with maximum pumping power. Due to the air compressor the composition of the gas mixture changes; however, this is still better than an insufficient amount of available gas mixture. In this control, instead of the boost pressure also another pressure may be used which depends on the boost pressure (for example an exhaust pressure). Furthermore, instead of the boost pressure another quantity/property may be used which increases with raising engine power, for example the engine speed.

It may be preferred that a storage tank may be provided and connected with the gasification tank. The storage tank includes organic compounds and serves for refilling the gasification tank. Alternatively manual refilling of the gasification tank via a closable opening at the gasification tank may also be provided.

Advantageously, by introducing the gas mixture, ignition of injected diesel in the combustion chamber can be effected. The gas mixture which comprises oxyhydrogen facilitates faster combustion. It may be preferred if an ignition timing is caused at a crankshaft angle of less than 20°, in particular between 17° and 19°, in particular between 17.5° and 18.5°, before the top dead center (of a piston of the internal combustion engine). This ignition timing can be defined and set by the timing of the introduction of the gas mixture into the combustion chamber. In this variant the ignition timing occurs tighter before the top dead center than usually. Such a late ignition timing can be chosen because the invention provides for a particularly fast combustion. At a desired point in time it is thus possible to create a larger pressure.

The invention also relates to a land vehicle, for example a truck, a car, a construction machine or another commercial vehicle, comprising a vehicle drive system configured as described.

The intended use of the described embodiments of the vehicle drive system results in variants of the method of the invention. Furthermore, preferred embodiments of the vehicle drive system of the invention, in particular its controller, may be configured to carry out the described variants of the methods of the invention.

BRIEF DESCRIPTION OF THE DRAWINGS

Further advantages and features of the invention will be described hereinbelow with reference to the attached schematic FIGURE, wherein:

FIG. 1 shows a schematic illustration of an embodiment of a vehicle drive system according to the invention.

DETAILED DESCRIPTION OF THE INVENTION

FIG. 1 shows schematically an embodiment of an inventive vehicle drive system 100 which may be part of a land vehicle (not shown), for example a truck.

As components the vehicle drive system comprises an electrolysis chamber 20 for producing hydrogen gas and oxygen gas, a gasification tank 30 for gasifying volatile organic compounds as well as an internal combustion engine 50 which is supplied with, in addition to a fossil energy carrier, also the produced hydrogen gas, the oxygen gas and the gaseous organic compounds.

By supplying this gas mixture, combustion of diesel or another fossil energy carrier can take place faster and less pollutants are produced which will be emitted in the exhaust.

Initially, water or another starting substance is converted in the electrolysis chamber 20 into hydrogen gas, oxygen gas and possibly further components, by using electrical energy.

The produced hydrogen gas and the produced oxygen gas are transported via a supply system or line system 28. These two gases may in particular be provided as a mixture, i.e., oxyhydrogen. For transportation a vacuum pump 25 is provided in the supply system 28. The vacuum pump 25 produces a reduced pressure in the electrolysis chamber 20, thus sucking off the oxygen gas and the hydrogen gas.

Furthermore, the reduced pressure in the electrolysis chamber 20 reduces the amount of electrolyte (which is present in the electrolysis chamber 20) that transfers from the liquid state into a gaseous sate. In this way, the efficiency of the electrolysis chamber 20 can be increased.

The supply system 28 supplies the oxygen gas and the hydrogen gas to the gasification tank 30. Organic compounds such as methanol and/or ethanol are provided in the gasification tank 30 and experience a surface gasification due to introduction of the hydrogen gas and the oxygen gas. To this end the hydrogen gas and the oxygen gas are introduced into the gasification tank 30 in a lower part thereof, in particular at its bottom. A gas mixture is thus formed within the gasification tank 30, comprising at least hydrogen gas, oxygen gas and gasified organic compounds, in particular methanol and/or ethanol. This gas mixture is then forwarded via a supply line 38.

The supply line 38 leads the produced gas mixture to a compressor 42 of a turbocharger 40. The gas mixture may be transported to the compressor 42 together with ambient air. For this merging, a corresponding line may be provided (not depicted). The gas mixture is led from the turbocharger 40 into a combustion chamber 52 of the internal combustion engine 50. In the combustion chamber 52 the gas mixture ignites and causes combustion of injected diesel fuel.

Exhaust gases are guided from the combustion chamber 52 via an exhaust line 54 to an exhaust turbine 44 of the turbocharger 40. A pressure of the exhaust gas is thus used by the exhaust turbine 44 to transport the gas mixture with the compressor 42 in the direction of the internal combustion engine 50. Downstream of the exhaust turbine 44, the exhaust gas reaches an exhaust filter 60.

A supply of the gas mixture into the combustion chamber 52 shall be increased if the amount of injected diesel fuel increases. For this purpose, inter alia, the turbocharger 40 is used. The compressor 42 of the turbocharger 40 is driven by the exhaust turbine 44. The exhaust turbine 44 drives the compressor 42 with more power if an exhaust pressure at the exhaust turbine 44 increases. If only small amounts of diesel are combusted in the combustion chamber 52, it follows that the pressure at the exhaust turbine 44 is small and the compressor 42 only produces a small suction in the supply line 38. If, on the other hand, larger amounts of diesel are combusted in the combustion chamber 52, then the compressor 42 will cause a stronger suction of gas mixture from the supply line 38.

Furthermore, the amount of the produced gas mixture may be controlled according to demand. To this end, controller 10 may be provided which may in particular be configured to adjust an electrical current through the electrolysis chamber 20 and may thus set the amount of hydrogen gas and oxygen gas to be produced. Furthermore, the controller 10 may control the vacuum pump 25 and may thus set the amount of hydrogen gas and oxygen gas that is transported from the electrolysis chamber 20 into the gasification tank 30. For increasing the amount of produced gas mixture, a larger electrical current and a higher pumping power of the vacuum pump 25 may be set. The amount of produced gas mixture may be set the larger, the higher the rate or amount of injected diesel into the combustion chamber 52. The boost pressure of the internal combustion engine 50 may be used as a measure for this. The controller 10 may thus be adjusted to increase the pumping power of the vacuum pump 25 and the electrical current in the electrolysis chamber 20 with increasing boost pressure. Pressure measuring means for this purpose may be provided. In the depicted example, pressure measuring means 12 are provided which measure an exhaust pressure upstream of the turbocharger 40. Also this exhaust pressure may be used for controlling the produced amount of gas mixture.

It may be desired to supply even larger amounts of gas mixture to the turbocharger 40 as can be achieved with a maximum current through the electrolysis chamber 20 and a maximum pumping power of the vacuum pump 25. In particular for such a case, an additional air compressor 35 may be provided. The air compressor 35 pumps air, in particular ambient air, into the gasification tank 30 and thus causes an increased gasification of the organic compounds. It may be desired if a line of the air compressor 35 and the line system 28 end at the vacuum pump 25 into a common line so that air from the air compressor 35 and hydrogen gas and oxygen gas produced by the electrolysis are let via the same nozzles into the gasification tank 30. In other variants, however, it may be preferred that the air from the air compressor 35 and the produced hydrogen gas and oxygen gas reach the gasification tank 30 through separated lines.

The controller 10 also set a pumping power of the air compressor 35. It may be provided that the air compressor 35 is only operated when the electrolysis chamber 20 is supplied with a maximum current and the vacuum pump 25 operates with maximum pumping power.

For cleaning the exhaust filter 60 particularly efficiently, it may be supplied with oxygen gas from the electrolysis chamber 20. In the depicted embodiment, a line 62 is provided for this purpose which leads from the electrolysis chamber 20 to the exhaust filter 60. Depending on the example embodiment disclosed herein, a design of the electrolysis chamber 20 may be preferred in which either oxygen gas is guided through the line 62 separated from and without the hydrogen gas or oxygen gas and hydrogen gas are together transported through the line 62.

By supplying the produced gas mixture to the fossil energy carrier in the combustion chamber 52, a particularly fast combustion is made possible. This allows ignition to take place very shortly before a top dead center of the piston of the internal combustion engine 50 which makes a higher efficiency possible. Furthermore the amount of produced pollutants in the exhaust is reduced.

The invention claimed is:

1. A vehicle drive system comprising:
an internal combustion engine for driving a vehicle,
wherein the internal combustion engine comprises a combustion chamber with injectors for injecting diesel into the combustion chamber,
a supply line for delivering a gas mixture to the combustion chamber,
an electrolysis chamber for producing hydrogen gas and oxygen gas, and a vacuum pump for sucking the hydrogen gas and the oxygen gas from the electrolysis chamber,
a gasification tank with volatile organic compounds received therein, and
an air compressor for pumping air into the gasification tank, wherein the gas mixture comprises gasified organic compounds from the gasification tank and at least a part of the hydrogen gas and the oxygen gas.

2. The vehicle drive system as defined in claim 1, wherein:
the vacuum pump and the gasification tank are arranged such that the hydrogen gas and the oxygen gas can be conveyed at least in part by the vacuum pump from the electrolysis chamber into the gasification tank to produce the gas mixture.

3. The vehicle drive system as defined in claim 1,
wherein the electrolysis chamber and a line system from the electrolysis chamber to the gasification tank are formed such that hydrogen gas and oxygen gas can be conveyed unseparated as oxyhydrogen.

4. The vehicle drive system as defined in claim 1, further comprising:
a turbocharger,
wherein the supply line is configured such that the gas mixture can be guided via a compressor of the turbocharger to the combustion chamber.

5. The vehicle drive system as defined in claim 1, wherein:
the hydrogen gas and oxygen gas guided into the gasification tank are introduced via a plurality of nozzles in a lower part of the gasification tank.

6. The vehicle drive system as defined in claim 1, further comprising:
an exhaust filter for purifying exhaust gases,
a separator for separating the hydrogen gas and the oxygen gas, which can be produced in the electrolysis chamber,
a line for guiding a proportion of the oxygen gas to the exhaust filter,
wherein the gas mixture guided by the supply line to the combustion chamber comprises the rest of the oxygen gas and the hydrogen gas as well as the gasified organic compounds.

7. The vehicle drive system as defined in claim 1, wherein:
the electrolysis chamber is supplied with an electric current, through which the hydrogen gas and the oxygen gas are obtained in the electrolysis chamber, and
the vehicle drive system further comprising a controller configured to control at least one of: the electric current, a water introduction into the electrolysis chamber, and a pumping power of the vacuum pump, as a function of a momentary property of an internal combustion engine operation.

8. The vehicle drive system as defined in claim 7, wherein:
the controller is configured:
control the at least one of: the electric current, the water introduction and the pumping power, based on a boost pressure of the internal combustion engine, and
increase the electric current and the pumping power, in response to an increase in the boost pressure.

9. A land vehicle comprising: the vehicle drive system as defined in claim 1.

10. A method for operating a vehicle drive system, the method comprising:
driving a vehicle with an internal combustion engine,
injecting diesel into a combustion chamber of the internal combustion engine via injectors,
producing hydrogen gas and oxygen gas in an electrolysis chamber,
drawing the hydrogen gas and the oxygen gas out of the electrolysis chamber with a vacuum pump, wherein:
volatile organic compounds are gasified in a gasification tank,
air is pumped into the gasification tank with an air compressor, and
a gas mixture comprising the gasified organic compounds and at least a part of the hydrogen gas and the oxygen gas is guided into the combustion chamber.

11. The method as defined in claim 10, wherein:
a reduced pressure is generated in the electrolysis chamber through the vacuum pump, producing a pressure between 200 mbar and 700 mbar.

12. The method as defined in claim 10, wherein:
during operation of the electrolysis chamber, an amount of the hydrogen gas and the oxygen gas is drawn from the electrolysis chamber by the vacuum pump such that at most a quarter of the electrolysis chamber is filled with gas.

13. The method as defined in claim 10, wherein:
ignition takes place at a crankshaft angle which is between 17° and 19° before top dead centre.

14. The method as defined in claim 10, wherein:
the vacuum pump is operated with maximum pumping power when a parameter for an engine power reaches a predefined threshold value, and the air compressor is additionally operated, which pumps air into the gasification tank, when the parameter increases over the predefined threshold value.

* * * * *